US012619897B2

(12) United States Patent　　　(10) Patent No.: US 12,619,897 B2

Leppäkangas　　　　　　　　　　　　(45) Date of Patent: May 5, 2026

(54) METHOD FOR SIMULATING AND EVALUATING AN ELECTRONIC SYSTEM

(71) Applicant: HQS Quantum Simulations GmbH, Karlsruhe (DE)

(72) Inventor: Juha Leppäkangas, Karlsruhe (DE)

(73) Assignee: HQS Quantum Simulations GmbH, Karlsruhe (DE)

( * ) Notice: Subject to any disclaimer, the term of this patent is extended or adjusted under 35 U.S.C. 154(b) by 902 days.

(21) Appl. No.: 17/799,749

(22) PCT Filed: Dec. 14, 2020

(86) PCT No.: PCT/DE2020/101060
§ 371 (c)(1),
(2) Date: Aug. 15, 2022

(87) PCT Pub. No.: WO2021/180258
PCT Pub. Date: Sep. 16, 2021

(65) Prior Publication Data

US 2023/0077751 A1　　Mar. 16, 2023

(30) Foreign Application Priority Data

Mar. 13, 2020　(DE) .................... 10 2020 106 959.6

(51) Int. Cl.
G06N 10/20 (2022.01)
G06N 10/60 (2022.01)

(52) U.S. Cl.
CPC ............. G06N 10/20 (2022.01); G06N 10/60 (2022.01)

(58) Field of Classification Search
CPC ............................... G06N 10/20; G06N 10/60
(Continued)

(56) References Cited

U.S. PATENT DOCUMENTS

| 11,119,773 | B1 * | 9/2021 | Soeken | .................. G06N 10/40 |
| 2003/0169041 | A1 * | 9/2003 | Coury | .................... G06N 10/20 |
| | | | | 324/312 |
| 2007/0288684 | A1 * | 12/2007 | Bergou | .................. G06N 10/20 |
| | | | | 711/101 |
| 2019/0102496 | A1 * | 4/2019 | Bishop | ...................... G06F 8/34 |
| 2019/0354897 | A1 * | 11/2019 | Horesh | .................. G06N 20/00 |

(Continued)

FOREIGN PATENT DOCUMENTS

| DE | 10 2018 119 459 A1 | 2/2020 |
| DE | 10 2019 135 807 A1 | 5/2021 |

OTHER PUBLICATIONS

Kreula et al., "Few-qubit quantum-classical simulation of strongly correlated lattice fermions," EPJ Quantrum Technology, 3:11 (2016).

(Continued)

*Primary Examiner* — Justin C Mikowski
(74) *Attorney, Agent, or Firm* — Collard & Roe, P.C.

(57) ABSTRACT

Quantum mechanical systems, such as for instance electronic states in molecules or solid bodies, can be simulated using quantum computers. However, at present quantum computers only provide a limited quantity of qubits for the calculation. This deficiency is attributable to unsolved problems in connection with inherent noise and scalability, with the result that quantum computers currently only enable simulations of small quantum systems. A method simulates and evaluates an electronic system with a continuous spectral density on the basis of the interruption of the quantum simulation by measurements. The quantum simulation is interrupted to read the qubits, the qubit measurements are stored in a classical parity register and restored to the qubits, and the simulation is continued after the restore.

6 Claims, 2 Drawing Sheets

Figure 1:
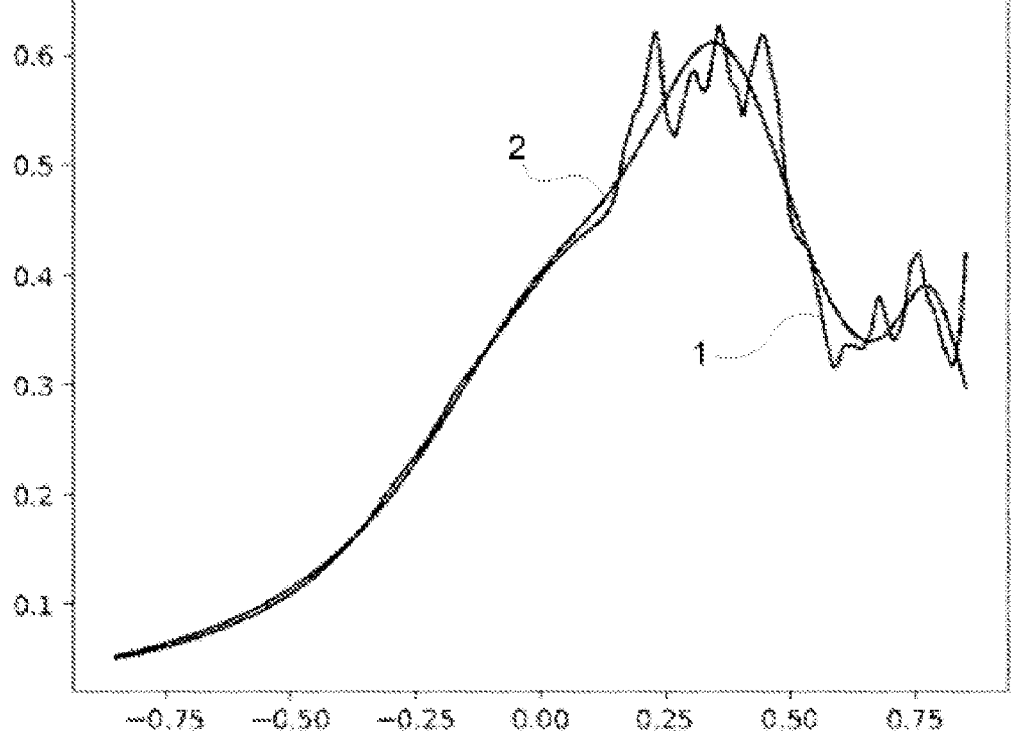

(58) Field of Classification Search
USPC ........................................................... 703/21
See application file for complete search history.

(56) References Cited

U.S. PATENT DOCUMENTS

| | | | |
|---|---|---|---|
| 2019/0378025 A1* | 12/2019 | Corcoles-Gonzalez | ..................... |
| | | | G06N 10/60 |
| 2019/0384597 A1* | 12/2019 | Horesh | .................. G06F 9/3001 |
| 2020/0184361 A1* | 6/2020 | Horii | ....................... G06F 9/455 |
| 2020/0242816 A1* | 7/2020 | Yang | ...................... G16H 30/40 |
| 2020/0279185 A1* | 9/2020 | Wiebe | .................... G06N 3/047 |
| 2020/0349457 A1* | 11/2020 | Low | ........................ G06N 10/60 |
| 2021/0216898 A1* | 7/2021 | Huffman | ............. G06F 11/0706 |
| 2021/0295194 A1* | 9/2021 | Low | ........................ G06N 10/20 |
| 2021/0374307 A1* | 12/2021 | Haener | ................... G06F 30/20 |
| 2021/0374586 A1* | 12/2021 | Kliuchnikov | ........ H03K 19/195 |
| 2021/0374591 A1* | 12/2021 | Kliuchnikov | .......... G06N 10/60 |
| 2025/0272587 A1* | 8/2025 | Sundaram | .............. G06N 10/20 |

OTHER PUBLICATIONS

Keen et al., "Quantum-classical simulation of two-site dynamical mean-field theory on noisy quantum hardware," arXiv:1910. 09512v1, pp. 1-8 (2019).

Chiaverini et al., "Realization of quantum error correction," Nature, vol. 432, Dec. 2, 2004, pp. 602-605.

International Search Report in PCT/DE2020/101060, dated Apr. 16, 2021.

J Cramer et al. "Repeated quantum error correction on a continuously encoded qubit by real-time feedback" Nature Communications, London, May 1, 2016 (May 1, 2016), p. 11526, Retrieved from the Internet: https://arxiv.org/pdf/1508.01388.pdf (23 pages).

Bela Bauer et al. "Quantum algorithms for quantum chemistry and quantum materials science" arxiy.org, Cornell University Library, 201 Olin Library Cornell University Ithaca, NY 14853, Jan. 10, 2020 (30 pages).

Kelly J et al. "Scalable in-situ qubit calibration during repetitive error detection" arxiy.org, Cornell University Library, 201 Olin Library Cornell University Ithaca, NY 14853, Mar. 9, 2016 (8 pages).

Iris Schwenk et al. "Estimating the error of an analog quantum simulator by additional measurements" arxiy.org, Cornell University Library, 201 Olin Library Cornell University Ithaca, NY 14853, Dec. 12, 2016 (6 pages).

Mark Steudtner et al. "Quantum codes for quantum simulation of Fermions on a square lattice of qubits" arxiy.org, Cornell University Library, 201 Olin Library Cornell University Ithaca, NY 14853, Aug. 2019 (43 pages),.

* cited by examiner 1, 2

METHOD FOR SIMULATING AND EVALUATING AN ELECTRONIC SYSTEM

CROSS REFERENCE TO RELATED APPLICATIONS

This application is the National Stage of PCT/DE2020/101060 filed on Dec. 14, 2020, which claims priority under 35 U.S.C. § 119 of German Application No. 10 2020 106 959.6 filed on Mar. 13, 2020, the disclosure of which is incorporated by reference. The international application under PCT article 21 (2) was not published in English.

The present invention relates to a method for simulating and evaluating an electronic system, in particular a solid body or a molecule with a continuous spectral density using a quantum computer having a plurality of qubits, wherein features of the electronic system are simulated on individual qubits and read from the qubits.

Such a method is already known from DE 10 2019 135 807 A1. This solves the problem of inherent noise and scalability deficiencies for the calculation and simulation of quantum mechanical systems, such as electronic systems, by means of a simulator for large, continuous quantum systems by using the noise as a resource to produce a continuous bath.

A quantum computer is a technically well-controlled quantum system of which the calculation is based on the use of the laws of quantum mechanics. The basic unit of the quantum computer is the quantum bit, the so-called qubit. Like the well-known classical bit, the qubit can assume the values 0 and 1. The main difference from the classical states is that the quantum memory can be in any superposition of the possible bit strings. It follows that a quantum register of N qubits encodes the information of $2^N$ variables. A sufficiently large and well-functioning quantum computer can be used to solve certain mathematical problems that cannot be solved by classical computers. Such problems also include simulations of other quantum mechanical systems.

However, there are many technical difficulties in building a large quantum computer. These difficulties can be roughly broken down into two major challenges, namely isolating the qubits from a noisy environment and controlling a large number of qubits simultaneously. These two sets of problems are not independent of one another, and improving the quantum computer with regard to one of the two problems usually adversely affects the quantum computer with regard to the other. It is currently possible to build quantum computers with around 20 to 50 qubits that work comparatively well. It is expected that more than 100 physical qubits will be available for commercial use in the near future.

A very promising application of small quantum computers is the simulation of other quantum mechanical systems. In fact, it can be shown that quantum simulation algorithms can be faster than any classical computer, even for a small number of qubits.

Against this background, the present invention is based on the object of providing an alternative to the previously known method for simulating and evaluating an electronic system by artificially generating a continuous electronic spectrum that makes it possible to simulate large electronic quantum systems with a small number of qubits.

This is achieved by a method for simulating and evaluating an electronic system according to the features of independent claim 1. Further meaningful configurations of such a system can be found in the subsequent dependent claims.

According to the invention, gate-based quantum simulation is considered in the present case. Here, the evolution of system time is reproduced by fast control pulses applied to physical qubits, which in turn describe the quantum state of the modeled system in some way. More specifically, the quantum simulation generated by the quantum computer is controlled by the Hamiltonian $H_{Qc}(t)$, which works with qubits of the quantum computer. The simulated system is described by the Hamiltonian H, which controls the time evolution of the electrons. These systems are ideally equivalent, meaning that there is an accurate mapping between the physical quantum state and the simulated quantum state.

The quantum simulation time evolution operator $U_{Qc}$ is designed to reproduce the system time evolution operator U in the following sufficient approximation:

$$U = \exp[-iHt] \approx U_{QC} = T\exp\left[-i\int_0^T dt' H_{QC}(t')\right]$$

Units are used in which $\hbar=1$ is applicable.

A gate-based quantum evolution is created by successive applications of identical Trotter steps, each representing a small time evolution over the simulation time dt. Ideally, each sequence performs the operation $$U_{QC}(dt) = \prod_{sets} \exp(-iH_{set}dt)$$

Here, all terms oscillate within $H_{set}$. All sets together cover all terms of the simulated Hamiltonian. The multiplication takes place in a selected, optimal order. The total time evolution over time t=ndt is then $$U_{QC}(t) = [U_{QC}(dt)]^n.$$

A widely studied model of various electronic systems that the present quantum computer system can simulate is the cluster-bath model defined by a Hamiltonian of the type $$H = H_C + H_B + H_I$$

$$H_C = \sum_{pq \in cluster} t_{pq} c_p^\dagger c_q + \frac{1}{2} \sum_{pqrs \in cluster} h_{pqrs} c_p^\dagger c_q^\dagger c_r c_s$$

$$H_B = \sum_{i \in bath} \omega_i c_i^\dagger c_i$$

$$H_I = \sum_{p \in cluster, i \in bath} t_{pi} c_p^\dagger c_i + t_{ip} c_i^\dagger c_p$$

The system description is divided into three parts: Cluster $H_C$, which fully describes electrons with interaction, a bath $H_B$ of non-interacting electrons, and electron hopping between the two regions $H_I$. The modeling within the cluster is as accurate as possible, while the bath and interaction are accounted for in the mean field approach. This provides the most detailed solvable description of many solid bodies and is the basis of dynamical mean field theory (DMFT). This can also be an efficient description of large molecules with a small reactive center: the cluster.

In such a model, the central function describing the effect of the bath on the cluster is the spectral density $S^\pm(\omega)$. The bath spectral density depends on whether it describes filled bath states (+) or empty bath states (−). The filled or empty states mean the populations of the bath when they are not interacting with the cluster. The spectral density $S^+(\omega)$, as seen from the cluster orbital p, has the form $$S^+_{p \in cluster}(\omega) = \sum_{i \in bath} \rho^+(\omega_i) t_{pi}^2 \delta(\omega + \omega_i)$$

$$S^-_{p \in cluster}(\omega) = \sum_{i \in bath} \rho^-(\omega_i) t_{pi}^2 \delta(\omega - \omega_i)$$

Here, the delta function $\delta(\omega \pm \omega_i)$ produces a sharp spectral peak with area 1 in the bath state with frequency $$\mp \omega_i,$$

where the factor $\rho^+(\omega)$ indicates the probability with which the bath state with the frequency co is occupied when not interacted with and $$\rho_i^- = 1 - \rho_i^+.$$

In thermal equilibrium, the following applies $$\rho^+ = \frac{1}{1 + \exp\left(+\frac{\omega}{k_B T}\right)}$$

$$\rho^- = \frac{1}{1 + \exp\left(-\frac{\omega}{k_B T}\right)}$$

where T is the bath temperature. The effect that the bath has on the cluster depends only on such bath spectral densities. In the case of a large bath, they can be approximated as continuous functions of frequency $\omega$.

In detail, the present method for simulating and evaluating an electronic system provides that the quantum simulation is interrupted to read the qubits, the qubit measurements are stored in a classical parity register and restored to the qubits, and the simulation is continued after the restore.

A quantum simulation of an electronic cluster-bath model with continuous spectral density requires a quantum computer with continuous qubit density. In the prior art, this is already achieved by exploiting the inherent noise of quantum computers in order to generate a quasi-continuous qubit density of states with a finite number of broadened qubits. However, an alternative method for generating the continuous system is proposed here, which is based on the interruption of a quantum simulation by measurements.

In such a simulation, the sharp spectral peaks of a plurality of bath states are broadened to Lorentzian functions.

$$S^\pm(\omega) = \frac{1}{\pi} \sum_{i \in bath} \rho^\pm(\omega_i) t_{pi}^2 \frac{\gamma_i}{\gamma_i^2 + (\omega \pm \omega_i)^2}$$

The broadening $\gamma_i$ corresponds, for example, to the decay rate of the qubit. Broadenings $\gamma_j$ can be controlled by measurements in the quantum simulation. This allows a continuous spectral density to be reproduced or matched by a limited number of qubits.

In order to reproduce the fermion statistics of the electrons, a classical bit registration must now also be implemented according to the invention, which stores the measurement results and whose values can be called up quickly before each gate sequence, i.e. each Trotter step.

A gate-based quantum simulation is constructed by successive application of Trotter steps. A step-by-step quantum simulation with physical measurements is provided, which causes a broadening of the qubits and corresponding bath states. Based on the same key processes, i.e. measurements on so-called auxiliary qubits and the use of a classical parity register, other similar methods can also be developed that lead to the same effect.

First, a method for expanding a bath state that is empty in the non-interactive state will be discussed. The bath state occupancy is described by the qubit states 0 and 1. Here a single Trotter step is realized as (i) an application-time evolution operation $U_{QC}(dt)$, i.e. the original Trotter step, (ii) carrying out an excitation exchange between a bath qubit and an auxiliary qubit assigned thereto, (iii) measuring the auxiliary qubit, (iv) if the auxiliary qubit was in the excited state, it is restored to its ground state. Then iteration takes place from step (i).

Such a time development realizes the effective decay, i.e. the amplitude damping, of the bath qubit, the excited state 1 of the bath qubit decaying toward its ground state 0 at the rate $\gamma = p/dt$, where $p \ll 1$ is the permutation probability in step (ii). This corresponds to a Lorentzian function $S^-(\omega)$, with $\rho^- = 1$ for an empty state.

An expansion of the filled states $[S^+(\omega)$ with $\rho^+ = 1]$ can be realized by always initializing the auxiliary qubit with the state 1. Similarly, the parity R is changed only if the auxiliary qubit was measured in state 0. In addition, the finite temperature can be modeled by using a statistical distribution for the initialized auxiliary qubit state. For this purpose, in step (iv) the initial state after the measurement is set to 0 with the probability $\rho^-$ and to 1 with the probability $\rho^+$. In doing so, the parity R is preferably changed only if the previously inserted auxiliary qubit state in step (iv) and thereafter the measured auxiliary qubit state in step (iii) do not match.

In the case of N>1 bath states to be broadened, a bath qubit can be selected at random in step (ii), the excitation of which is swapped with the associated auxiliary qubit. The broadening of the bath state i is in this case $\gamma_i = p_i/(Ndt)$, where $p_i$ is the permutation probability selected separately for each bath qubit. In another implementation, all bath qubits have their own auxiliary qubits, and all permutations and subsequent measurements are done in parallel. Here, $\gamma_i = p_i/dt$.

A major difficulty in realizing a quantum electronic simulation with a quantum computer is the antisymmetry of the fermionic wave function. The antisymmetry is not automatically taken into account by physical qubits, but must be encoded in the calculation. This can be done, for example, by the Jordan-Wigner decomposition of fermionic operators into qubit operators.

An example is an electron jump operator from state i to state p, which can be represented by the corresponding qubit exchange operators and the Jordan-Wigner decomposition as $$\hat{T}_{pi} = \hat{c}_p^\dagger \hat{c}_i \rightarrow \hat{\sigma}_p^- \hat{\sigma}_i^+ \prod_{p>k>i} \hat{\sigma}_k^z$$

Here, $$\sigma_k^z$$

is a Pauli matrix describing the qubit k, and the Jordan-Wigner chain is $$S = \prod_{p>k>i} \hat{\sigma}_k^z$$

It should be noted that this decomposition preserves quantum parallelism, since exponentially many variations of collective qubit states can be operated simultaneously.

A broadened bath does not yet describe a continuous fermionic bath, since the antisymmetry of the entire fermionic wave function is not taken into account. It has been shown that this can be accounted for by a certain type of counting of measured states of auxiliary qubits that are stored in the parity register R. The parity register R is a classical register. After each Trotter step, it contains a series of binary values. The missing parity is taken into account by using jump operators of the form $$\hat{T}_{pi} = \hat{\sigma}_p^+ \hat{\sigma}_i^- \prod_{p>k>i} \hat{\sigma}_k^z (1 - 2R_k)$$

Here, the Jordan-Wigner chain was generalized to $$S = \prod_{p>k>i} \hat{\sigma}_k^z (1 - 2R_k)$$

Here, the factors $1 - 2R_k$ are either 1 or −1. This factor is then taken into account when performing step (i) of the Trotter step.

The invention described above is explained in more detail below with reference to an embodiment.

Figure 2:
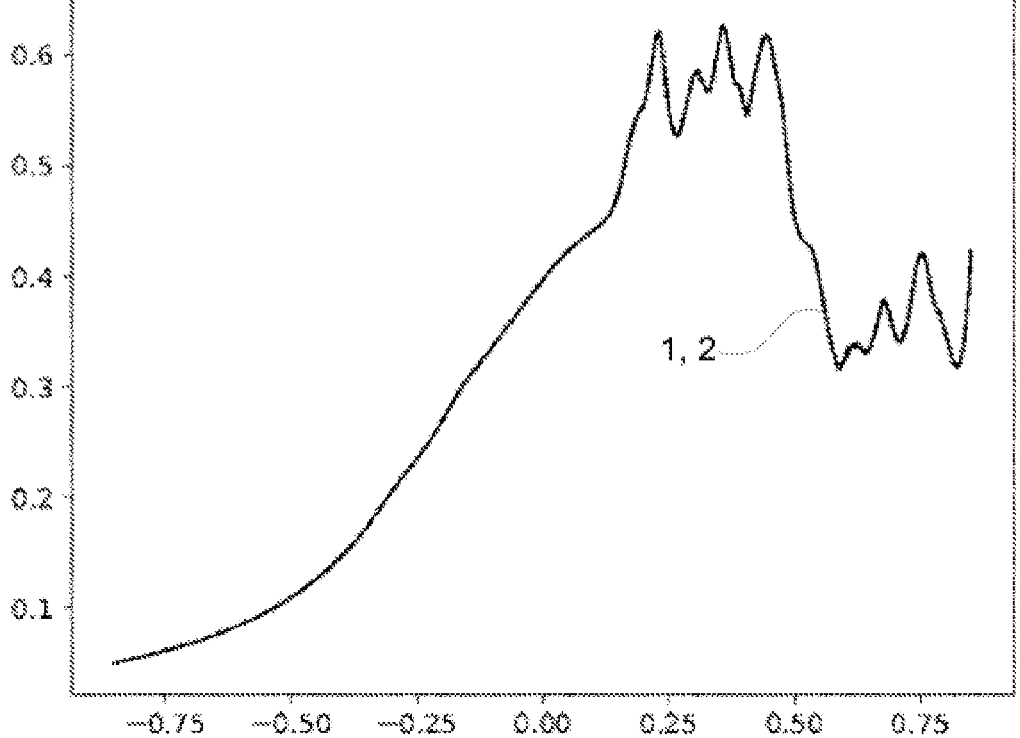

FIG. 1 is an example of the adjustment of the original continuous spectral density by means of three Lorentzian functions, FIG. 2 by twenty Lorentzian functions using the least squares method. In the system considered, each Lorentzian function corresponds to a bath qubit. The adjustment optimizes the positions $\omega_r$, broadenings $\gamma_i$ and couplings $t_i$ of bath qubits. A spectral curve 1 and an approximation curve 2 are shown.

The following example describes how the amplitude damping of bath states occurs according to the method described above. Step (ii) of the Trotter step described above is analogous for all bath qubits, so it suffices to record it for just one bath qubit.

An exchange between the bath qubit $B_1 \equiv B$ and the auxiliary qubit A is then considered. In the following, all other qubits except $B_1$ and A are referred to as the rest.

Initially, the auxiliary qubit A is in state ($|0\rangle$). Step (ii) corresponds to a transformation from an uncorrelated product state with the auxiliary qubit ($|product\rangle$) to an entangled state ($|entangled\rangle$). The corresponding unitary operation acts only in the subspace of the single excitation and is spanned by the states $(|A{=}0\rangle)(|B{=}1\rangle)$ and $(|A{=}1\rangle)(|B{=}0\rangle)$. It can take the form $$U_{swap} = \exp(i\tilde{p}\sigma_y^{SE}) = \cos\tilde{p} I^{SE} + i\sin\tilde{p}\sigma_y^{SE}$$

$$\cos\tilde{p} = \sqrt{1-p}$$

$$\sin\tilde{p} = \sqrt{p}$$

If the state is not in the subspace of the single excitation, i.e. in the state $(|A{=}0\rangle)(|B{=}0\rangle)$ or $(|A{=}1\rangle)(|B{=}1\rangle)$, then only the identity operation is carried out. The result of the $U_{swap}$ operation applied to the state initialized before step (i) within the Trotter step is then $$U_{swap}(|product\rangle) = U_{swap}[|(\Psi_0\rangle_{rest})|(0\rangle_B) + |(\Psi_1\rangle_{rest})|(1\rangle_B)] \otimes |(0\rangle_A)$$

$$= |(\Psi_0\rangle_{rest})|(0\rangle_B(0\rangle_A) + \sqrt{1-p}\,|(\Psi_1\rangle_{rest})|(1\rangle_B)|(0\rangle_A) + \sqrt{p}\,|(\Psi_1\rangle_{rest})|(0\rangle_B)|(1\rangle_A)$$

Here, the excited state of the bath qubit B is transferred with the probability $p \leq 1$ to the auxiliary qubit A. A common normalization factor $$1/\sqrt{2}$$

was neglected in this case. In the following, $p \ll 1$ is assumed.

Step (iii) of the Trotter step corresponds to measuring the state of the auxiliary qubit A. The new state of the system, due to the measurement result, is $$|product\rangle = |(\Psi_0\rangle_{rest})|(0\rangle_B)|(0\rangle_A + \sqrt{1-p}\,)|(\Psi_1\rangle_{rest})|(1\rangle_B)|(0\rangle_A)$$

for measured A=0, and $$|product\rangle = \sqrt{p}\,|(\Psi_1\rangle_{rest})|(0\rangle_B)|(1\rangle_A)$$

for measured A=1.

Here, too, the state normalization was neglected. If A=1 is measured, an excitation jumps into the auxiliary qubit. In this case, the parity information of the corresponding classical register must be updated, $R_i \rightarrow R_i + 1 \pmod 2$.

In the Hilbert space, which is spanned by the bath states $|(B{=}0\rangle \equiv (1.0))$ and $|(B{=}1\rangle \equiv (0.1))$, this measurement can be represented in the form of Kraus operators $$M_0 = \begin{pmatrix} 1 & 0 \\ 0 & \sqrt{1-p} \end{pmatrix}$$

$$M_1 = \begin{pmatrix} 0 & \sqrt{p} \\ 0 & 0 \end{pmatrix}$$

Using the Kraus operators, the initial pure state described by a matrix having a reduced density $$\hat{D} = |(\text{pure})\rangle\langle(\text{pure})|$$

changes to a probabilistic mixture $$\hat{D} \to M_0 \hat{D} M_0^\dagger + M_1 \hat{D} M_1^\dagger$$

Our central assumption is the exchange probability $p \ll 1$, which allows us to approximate the matrix $M_0$ as follows $$M_0 \approx \begin{pmatrix} 1 & 0 \\ 0 & 1 - \frac{p}{2} \end{pmatrix}$$

In this approximation, the density matrix changes as follows $$\hat{D} \to$$

$$M_0 \hat{D} M_0^\dagger + M_1 \hat{D} M_1^\dagger \approx \hat{D} + p\sigma^- \hat{D}\sigma^+ - \frac{p}{2}\sigma^+\sigma^- \hat{D} - \frac{p}{2}\hat{D}\sigma^+\sigma^- \equiv \hat{D} + \mathcal{L}[\hat{D}]$$

where the Lindblad superoperator can be identified with $$\mathcal{L}[\hat{D}] \equiv p\left(\sigma^- \hat{D}\sigma^+ - \frac{1}{2}\sigma^+\sigma^- \hat{D} - \frac{1}{2}\hat{D}\sigma^+\sigma^-\right)$$

and $\sigma^- \equiv |(0)\rangle\langle(1|$ and $\sigma^+ \equiv |(1)\rangle\langle(0|$.

Therefore, by repeatedly performing similar entanglement operations and measurements of A, a probabilistic decay of bath operating populations with the decay rate $\gamma = p/dt$ is approximately generated. This in turn corresponds to a Lorentzian peak in the bath spectral density.

A method for simulating and evaluating an electronic system is thus described above, providing an alternative to the previously known method for simulating and evaluating an electronic system by artificially generating a continuous electronic spectrum that makes it possible to simulate large electronic quantum systems with a small number of qubits.

LIST OF REFERENCE SIGNS

1 Spectral curve
2 Approximation curve
The invention claimed is:
1. A method for simulating and evaluating an electronic system having a continuous spectral density, the method comprising:
    generating a continuous spectral function in a quantum simulation of an electronic cluster-bath model using a quantum computer having a plurality of qubits, wherein features of the electronic system are simulated on individual qubits and read from the qubits;
    wherein the quantum simulation is interrupted to read the qubits, the qubit measurements are stored in a classical parity register and restored to the qubits, and the simulation is continued after the restore;
    wherein the simulation of the electronic system comprises an accurate simulation of a cluster, as well as a simulation of a bath and an electron hopping interaction according to a mean-field approach for describing electron-electron correlations in the modeled electronic system; and
    wherein the reading of the qubits occurs in a Trotter step which iteratively carries out the steps of:
    applying a time evolution operation $U_{QC}$ (dt,R) taking into account parities stored in the parity register R;
    exchanging excitation states between a respective bath qubit and an auxiliary gubit assigned to said bath qubit;
    measuring a state of the auxiliary gubit;
    changing an associated parity R→R+1 (mod2) if an initial state of the auxiliary qubit and the measured state of the auxiliary qubit do not match; and
    setting an initial state of the auxiliary gubit to 0 with a probability $\rho^-$ and to 1 with a probability $\rho^+$, and returning to the first step.
2. The method according to claim 1, wherein sharp, spectral peaks of states of the qubits of the quantum computer associated with the bath are broadened to Lorentzian functions, thereby controlling a broadening of the peaks.
3. The method according to claim 1, wherein the auxiliary qubit is initialized to state 1.
4. The method according to claim 1, wherein the parity R is changed only if the auxiliary qubit is measured in state 0.
5. The method according to claim 1, wherein auxiliary qubits are uniquely assigned to a plurality of bath qubits and a plurality of auxiliary qubits are read in parallel.
6. The method according to claim 1, wherein the anti-symmetry of the fermionic wave function is taken into account by coding using the Jordan-Wigner decomposition.

\* \* \* \* \*